| United States Patent [19] | [11] Patent Number: 4,964,652 |
| Karlow | [45] Date of Patent: Oct. 23, 1990 |

[54] INFLATABLE RESTRAINT

[75] Inventor: James P. Karlow, Milford, Mich.

[73] Assignee: Automotive Systems Laboratory, Inc., Farmington Hills, Mich.

[21] Appl. No.: 371,327

[22] Filed: Jun. 26, 1989

[51] Int. Cl.⁵ ............................................ B60R 21/28
[52] U.S. Cl. .................................. 280/731; 280/730; 280/739; 280/743
[58] Field of Search ................ 280/731, 739, 728, 730

[56] References Cited

U.S. PATENT DOCUMENTS 3,747,953  7/1973  Goes et al. ........................ 280/739
4,877,264  10/1989  Cuevas ............................. 280/739

*Primary Examiner*—Kenneth R. Rice
*Attorney, Agent, or Firm*—Lyon & Delevie

[57] ABSTRACT

A system for venting excessively high pressure gas incident to deployment of an airbag comprising a diaphragm that is rupturable upon the occurrence of a threshold pressure internally of the airbag to instantaneously release said pressure.

1 Claim, 2 Drawing Sheets

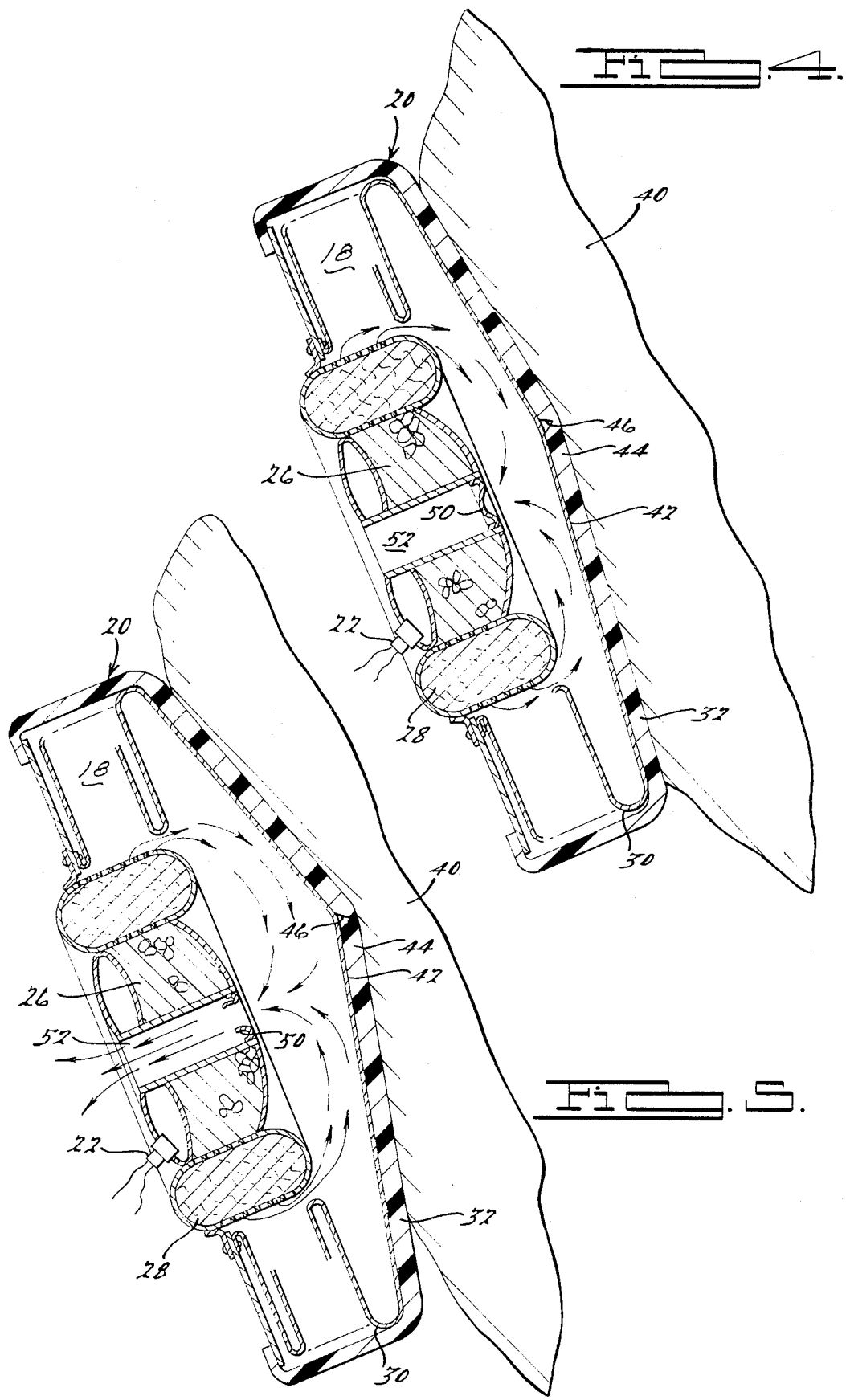

INFLATABLE RESTRAINT

BACKGROUND OF THE INVENTION

This invention relates generally to an inflatable restraint for an occupant of a motor vehicle and more particularly to an inflatable restraint that mitigates the potential of injury to a driver of a motor vehicle caused by late deployment of an airbag incident to a vehicle crash.

Late deployment is a condition that obtains when, for example, the driver of a vehicle has translated forwardly from his normal seated position behind the steering wheel of the vehicle to a point where his chest is either in close proximity to or in contact with an airbag module mounted centrally of the steering wheel at the time of initiation of inflation. In this situation the potential for injury from the crash is increased due to the opening force of the airbag module cover and deployment of the airbag against the driver's chest. The potential for injury is strongly correlated with the force with which the opening cover and deploying airbag impacts the vehicle occupant during the first 20 milliseconds of deployment.

It is known to control the opening force of the airbag module as well as the rate of bag deployment by controlling the burn rate of the gas producer during the first 10 to 15 milliseconds immediately following initiation. Initial gas production is limited to a relatively low level until opening of the airbag module cover after which pressurization is allowed to increase rapidly to complete deployment of the airbag.

Another method of controlling the opening force of an airbag module cover and airbag deployment is to provide an alternate path for the deploying bag to escape. This is done by changing the pattern and shape of the airbag cover so that if the front of the cover is loaded by the vehicle occupant, the airbag can escape by bursting out the sides of the cover. Gas pressure is relieved due to the increasing volume of the deploying airbag.

However, the aforesaid measures do not completely mitigate potential injury due to late deployment of an airbag.

SUMMARY OF THE INVENTION

The present invention relates to a gas pressure control system for minimizing the force exerted on a vehicle occupant due to late deployment of an airbag. Gas pressure control is utilized only in the event the occupant is positioned against the airbag module in which event a pressure relief valve opens to provide an escape channel for abnormally high pressure gases. After the early stages of deployment and the bag is fully deployed from the module, conventional vent holes in the airbag are exposed.

BRIEF DESCRIPTION OF THE DRAWINGS

FIG. 4 is a view similar to FIG. 3 after initiation of the gas generator of the airbag module; and FIG. 5 is a view showing opening of the pressure relief valve to control initial gas pressure.

DESCRIPTION OF THE PREFERRED EMBODIMENT OF THE INVENTION

Figure 1:
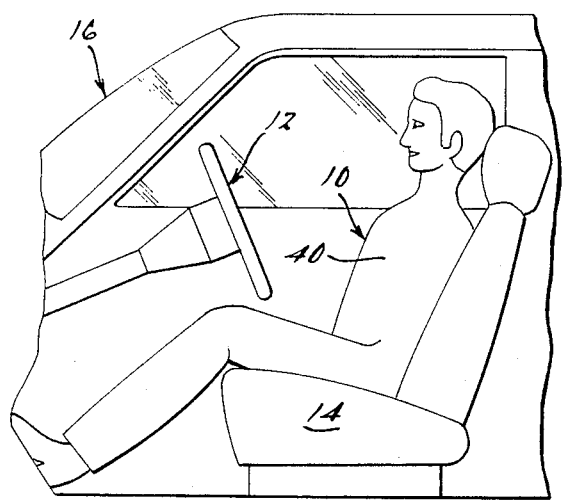
FIG. 1 is an elevational view of a vehicle occupant in a normal position behind the steering wheel of a vehicle.

As seen in FIG. 1 a vehicle occupant 10 is seated in a normal position behind a steering wheel 12 on a seat 14 of a conventional motor vehicle 16.

Figure 2:
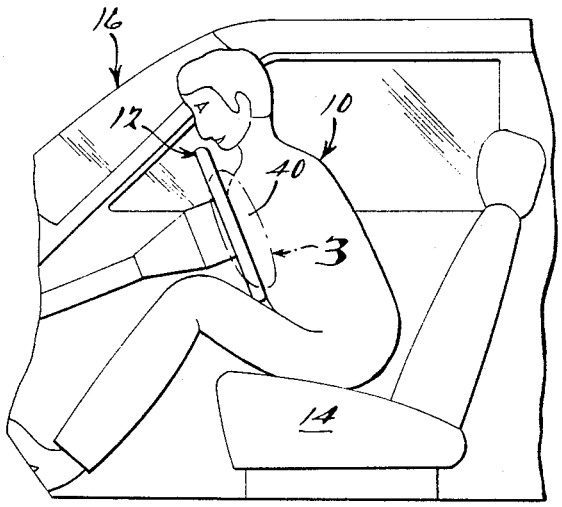
FIG. 2 is a view of the occupant of FIG. 1 after sudden deceleration of the vehicle but prior to deployment of an airbag.

As seen in FIG. 2, rapid deceleration of the vehicle 16 causes the occupant 10 to pitch forwardly toward the steering wheel 12. In the event of late deployment of a steering wheel mounted airbag 18 contained within an airbag module 20, the occupant 10 may impinge upon the steering wheel 12 prior to such deployment.

Figure 3:
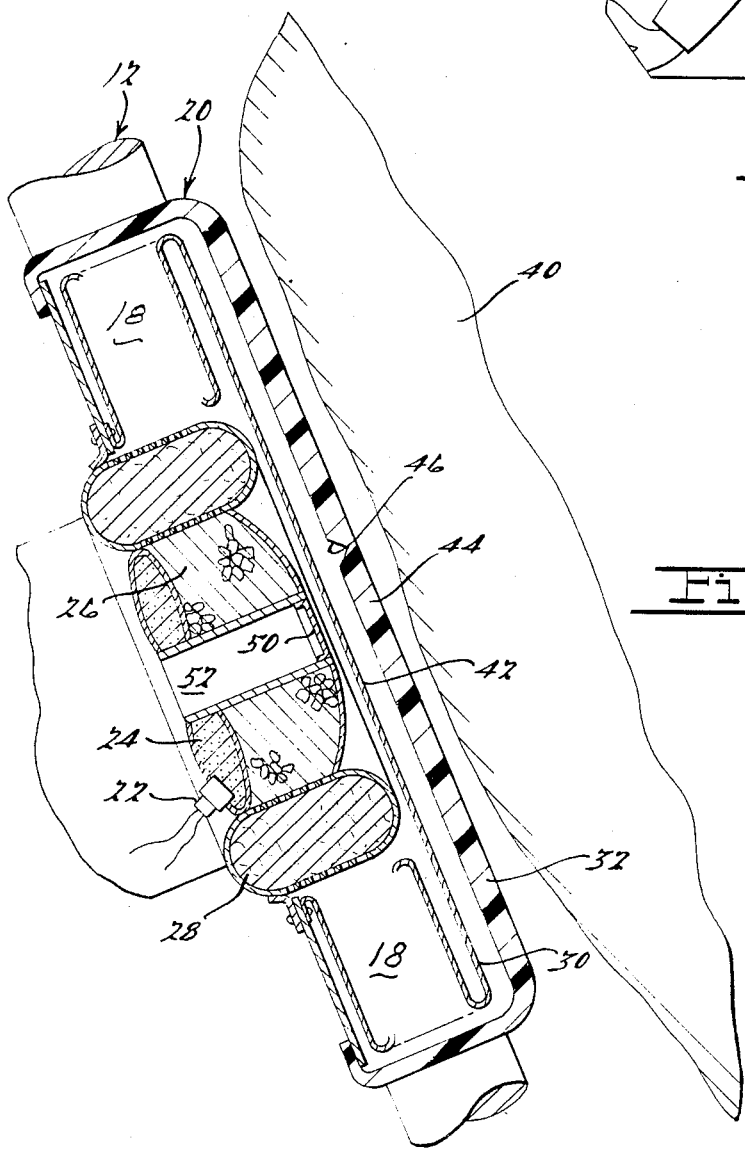
FIG. 3 is a sectional view of the airbag module taken within the circle 3 of FIG. 2.

As seen in FIG. 3, the airbag 18 is folded into the airbag module 20 which is mounted centrally of the steering wheel 12. The airbag module 20 comprises a squibb 22 that is electrically energized by, for example, an inertia sensor (not shown), upon the occurence of sudden deceleration of the vehicle 16. The squibb 22 effects ignition of a primer 24 which, in turn, effects ignition of a gas generating charge 26 which discharges through a filter 28.

In the event of late deployment (see FIGS. 2-5) the thorax 40 of the occupant 10 is either in contact with or in close proximity to the airbag module 20 at the time of inflation initiation. Upon initiation of the gas generator 26, gas flows through the filter system 28 into the folded bag 18. With little initial volume available for expansion due to compaction of the bag 18 in the module 20, the relatively high pressure gas acts on a front panel 30 of the bag 18, pushing it against a frangible cover element 44 of the module 20. The cover element 44 is designed with tear seams 46 which easily yield and tear during normal deployment of the airbag 18 allowing the front of the deploying bag 18 to escape through the cover element 44.

However, in the event of late deployment, opening of the cover element 44 is restricted by the thorax 40 of the occupant 10. Due to the aforesaid restriction, pressure builds in the bag 18 to a level at which it, in accordance with the present invention, causes a diaphragm 50, mounted within a gas relief channel 52 of the module 20, to burst. When the diaphragm 50 bursts, gas flows through the relief channel 52 and is vented into the vehicle interior. The thickness of the diaphragm 50 as well as the diameter of the channel 52 are governed by individual system parameters. Pressure relief obtained with the aforesaid system during the early stages of late deployment materially reduces potential injury.

From the foregoing description it should be apparent that the present invention constitutes a new approach to solving the problem of late deployment of an airbag. The invention contemplates the provision of a pressure relief channel 52 and control valve 50 which are inoperative incident to normal deployment but which become functional upon the occurrence of late deployment.

The controlled venting path 52 is available immediately upon initiation for the relief of excessively high pressure gas when such pressure relief is needed and while the airbag 18 is still substantially contained within the module 20.

While the preferred embodiment of the invention has been disclosed, it should be appreciated that the invention is susceptible of modification without departing from the scope of the following claims.

I claim:

1. An inflatable restraint for the occupant of a motor vehicle comprising an airbag module having a frangible cover member, an inflatable airbag disposed internally of said module and adapted to rupture the cover member thereof upon inflation of said airbag, a gas generator communicating with the interior of said airbag, a pressure relief channel communicating with the interior of said airbag and with the ambient environment externally of said module, and a rupturable diaphragm in said pressure relief channel normally positively separating the interior of said airbag from the ambient environment, said diaphragm being rupturable upon the occurrence of a predetermined threshold pressure in said airbag prior to full deployment thereof thereby to instantaneously relieve pressure in said airbag to preclude excessive deployment impact on said vehicle occupant.

* * * * *

UNITED STATES PATENT AND TRADEMARK OFFICE
CERTIFICATE OF CORRECTION

PATENT NO. : 4,964,652

DATED : October 23, 1990

INVENTOR(S) : James P. Karlow

It is certified that error appears in the above-identified patent and that said Letters Patent is hereby corrected as shown below:

On the title page item [73] Assignee: should be --Inflation Systems, Inc.--.

Signed and Sealed this

Third Day of March, 1992

Attest:

HARRY F. MANBECK, JR.

*Attesting Officer*      *Commissioner of Patents and Trademarks*